United States Patent [19]

Gokhale et al.

[11] Patent Number: 5,291,133
[45] Date of Patent: Mar. 1, 1994

[54] MULTI-BIT ENCODER SIGNAL CONDITIONING CIRCUIT HAVING COMMON MODE DISTURBANCE COMPENSATION

[75] Inventors: Kalyan P. Gokhale, Shelby Township, Macomb County; Thaddeus Schroeder, Rochester Hills, both of Mich.

[73] Assignee: General Motors Corporation, Detroit, Mich.

[21] Appl. No.: 933,536

[22] Filed: Aug. 24, 1992

[51] Int. Cl.[5] .......................... G01B 7/30; H03M 1/22; G01R 19/30
[52] U.S. Cl. .......................... 324/207.25; 324/207.12; 324/207.21; 341/15
[58] Field of Search ........... 324/160, 163, 166, 207.12, 324/207.2, 207.21, 207.25, 103 R, 103 P; 310/68 B; 341/13-15

[56] References Cited

U.S. PATENT DOCUMENTS

| | | | |
|---|---|---|---|
| 3,916,326 | 10/1975 | Woyton | 324/166 X |
| 4,027,212 | 5/1977 | Studer | 318/138 |
| 4,215,310 | 7/1980 | Schwerer, III | 324/225 |
| 4,480,248 | 10/1984 | Sudo et al. | 338/32 R |
| 4,506,339 | 3/1985 | Kuhnlein | 324/163 X |
| 4,599,561 | 7/1986 | Takahashi et al. | 324/208 |
| 4,644,270 | 2/1987 | Oates et al. | 324/103 P X |
| 4,746,859 | 5/1988 | Malik | 324/208 |
| 4,801,830 | 1/1989 | Ogino et al. | 310/68 B |
| 4,810,967 | 3/1989 | Yokoyama et al. | 324/208 |
| 4,847,555 | 7/1989 | Stammer et al. | 324/161 |
| 4,853,632 | 8/1989 | Nagano et al. | 324/208 |
| 4,866,382 | 9/1989 | Carmen | 324/208 |
| 5,001,363 | 3/1991 | Anami | 324/207.12 X |

Primary Examiner—Gerard R. Strecker
Attorney, Agent, or Firm—Mark A. Navarre

[57] ABSTRACT

A signal conditioning circuit which converts multiple analog signals received from an encoder into a multi-bit digital signal, corresponding to the angular position of a rotary object, which is independent of any common mode disturbances such as temperature, humidity, ambient light and aging. At any given time, at least one of the analog signals is at a maximum voltage and at least one of the analog signals is at a minimum voltage. At no time are all of the analog signals simultaneously at a maximum or simultaneously at a minimum. The signal conditioning circuit continuously detects the maximum and minimum values of the analog signals. A midpoint of the maximum and minimum values is determined and compared with the original analog signals. For all values of the analog signals greater than the midpoint value, a binary logic level of 1 is outputted. For all values of the analog signals less than the midpoint value, a binary logic level of 0 is outputted. There is one comparator and corresponding binary output for each analog signal. In combination, the comparators form the necessary multi-bit digital signal.

6 Claims, 3 Drawing Sheets

MULTI-BIT ENCODER SIGNAL CONDITIONING CIRCUIT HAVING COMMON MODE DISTURBANCE COMPENSATION

This invention relates to a signal conditioning circuit, and more particularly a circuit which converts multiple analog signals received from an encoder into a multi-bit digital signal, independent of any common mode disturbances, which corresponds to the angular position of a rotary object.

BACKGROUND OF THE INVENTION

An encoder converts the angular position of a rotary object into multiple analog signals. Encoder devices comprise sensory elements which have properties that vary with the intensity of light (optoelectric) or magnetic fields (Hall Effect or Magnetoresistive). The encoder/rotary object combination is constructed whereby the encoder elements are subjected to a light or magnetic field intensity which varies with the angular position of the rotary object. Each encoder sensory element converts the varying light or magnetic field intensity into a separate proportional electrical analog signal.

The analog signals are fed into a conditioning circuit which converts them into binary logic level signals (1 or 0) for use by digital equipment such as computers and microprocessor-based controllers. The conversion process involves comparing each analog signal with a constant threshold voltage, ideally equal to the midvalue (bias) of that analog signal's maximum and minimum extremes. All analog signal voltages greater than the threshold voltage results in a binary value of 1. All analog signal voltages less than the threshold voltage results in a binary value of 0.

Unfortunately, encoder elements are also sensitive to variations in temperature, humidity, ambient light, aging, etc., often referred to as disturbances. When each of the encoder elements is subject to the same disturbance, it is termed a common mode disturbance.

Common mode disturbances will affect an analog signal's maximum-to-minimum (peak-to-peak) voltage as well as its bias voltage. Failure to compensate the threshold voltage for variations in bias voltage may produce faulty logic level signals and result in incorrect position detection.

SUMMARY OF THE PRESENT INVENTION

This invention is directed to a signal conditioning circuit which compensates for common mode disturbances of multiple analog signals generated by an encoder. At any given time, the voltage of at least one of the analog signals is at a maximum and the voltage of at least one of the analog signals is at a minimum. At no time are the voltages of all of the analog signals simultaneously at a maximum or simultaneously at a minimum. The signal conditioning circuit yields an accurate multi-bit digital signal which corresponds to the angular position of a rotary object.

Each encoder analog output signal is continuously fed into maximum and minimum voltage detecting circuits which detect a single absolute maximum voltage and single absolute minimum voltage of the multiple analog signal combination. The maximum and minimum voltages are added together and divided by two, obtaining an average of the two extremes. This average is the variable threshold voltage to which is compared, via multiple comparators, the original analog signals. Only analog signal voltages above the threshold voltage will produce a binary value of 1. Analog signal voltages below the threshold voltage will produce a binary value of 0. Each analog signal has its own comparator. The binary output of the comparators, when read together, results in a multi-bit digital signal corresponding to the angular position of the rotary object.

In the illustrated embodiment, the encoder which supplies the required analog signals to the signal conditioning circuit is described in the context of a single package magnetoresistor comprising three magnetic field sensing elements for determining the absolute rotor position of a brushless DC motor. In a brushless DC motor, the rotor field is generated with permanent magnets, and the stator field is generated by sequentially energizing a plurality of stationary windings. In lieu of the brushes and commutator in a conventional DC motor, a brushless DC motor requires an absolute rotor position sensor for commutation control.

DETAILED DESCRIPTION OF THE PREFERRED EMBODIMENTS

Figure 1:
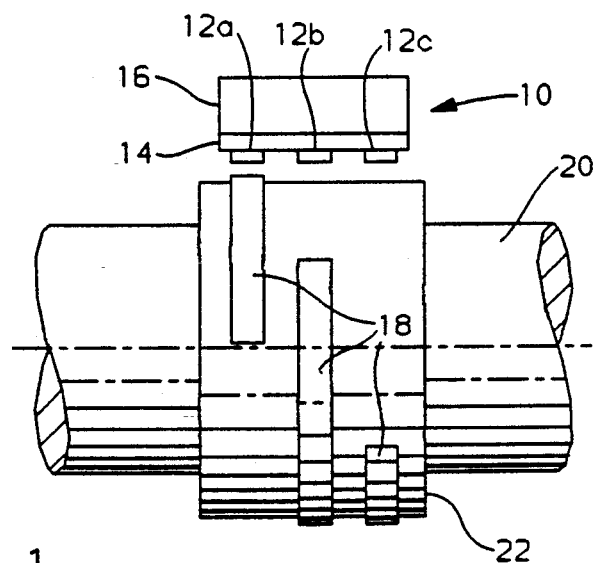
FIG. 1 illustrates a single package magnetoresistive sensor and a three track encoder wheel for a brushless DC motor.

Referring to FIG. 1, the embodiment of this invention receives three analog signals from a single magnetoresistive sensor 10 comprising three thin-film magnetoresistive elements 12 linearly arranged on a single chip of common substrate 14 mounted on a small permanent magnet 16. Magnetoresistive elements 12a, 12b and 12c are galvanomagnetic devices sensitive to magnetic flux density. Arranged as in FIG. 1, each magnetoresistive element 12a, 12b and 12c outputs an analog signal responsive to the position of three staggered ferromagnetic tracks 18 attached to a non-magnetic sleeve 22 fitted over the rotor shaft 20 of a brushless DC motor.

With an encoder track 18 located directly under a magnetoresistive element 12, the resultant air gap flux density experienced by the magnetoresistive element 12 is increased. The increased flux density will result in an increased resistance of the magnetoresistive element 12, proportionally affecting the output voltage of that magnetoresistive element 12.

Figure 2:
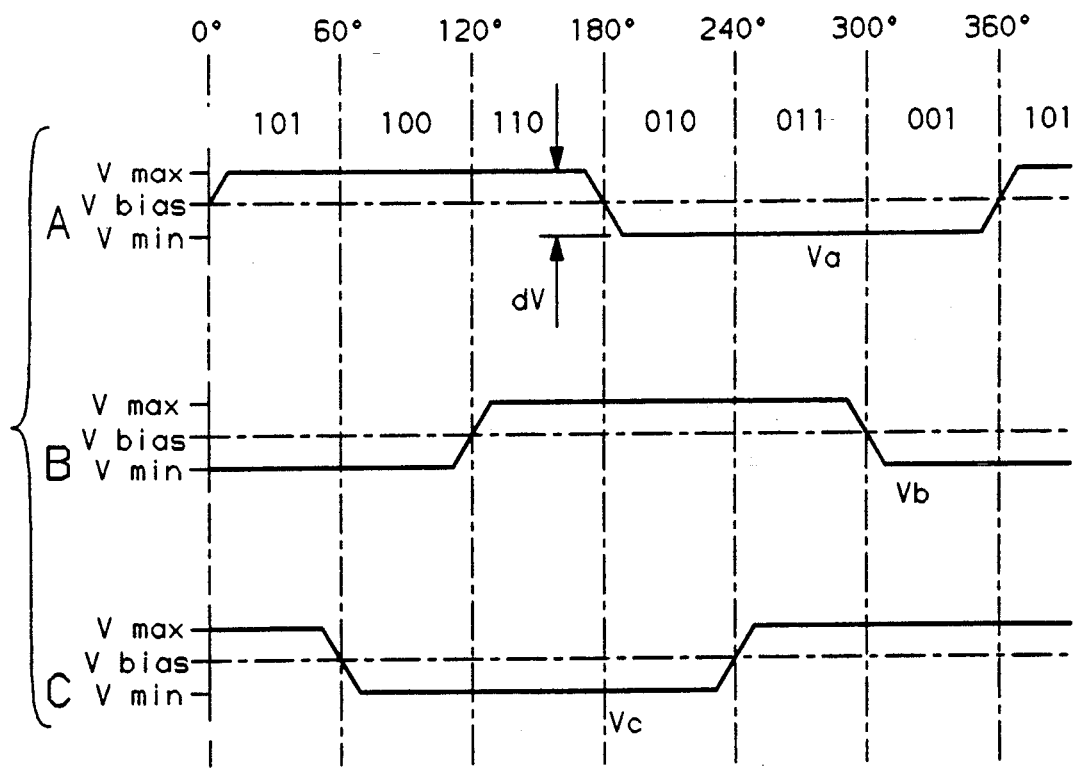
FIGS 2(A, B and C) illustrates typical analog output voltages from a magnetoresistive sensor of the type depicted in FIG. 1.

FIGS. 2(A, B and C) illustrates typical analog output voltages Va, Vb and Vc from the three magnetoresistor elements 12a, 12b and 12c shown in FIG. 1. Brushless DC motors require 60 degree electrical resolution for commutation control. This can be achieved by three analog signals sequentially phase shifted 120 electrical degrees. Every 60 electrical degrees (which in this case corresponds to 60 mechanical degrees of shaft rotation) results in the transition of only one signal from Vmax to Vmin, or vice-versa. Vmax corresponds to the output voltage of a magnetoresistive element 12 with an encoder track 18 located directly under that element 12.

Vmin corresponds to the output voltage of a magnetoresistive element 12 without an encoder track 18 located directly under that element 12.

As the shaft 20 rotates, the encoder tracks 18 will pass by the magnetoresistive elements 12, resulting in transitions every 60 electrical degrees from Vmax to Vmin, and vice-versa. Vbias is the midvalue (average) between the maximum and minimum signal voltages. The analog output voltages are converted into binary logic level signals (1 or 0) by comparing them with a predetermined constant threshold voltage ideally selected to be equal to Vbias. All analog signal voltages greater than the threshold voltage will produce a binary value of 1, while analog signal voltages less than the threshold voltage will produce a binary value of 0.

Figure 3:
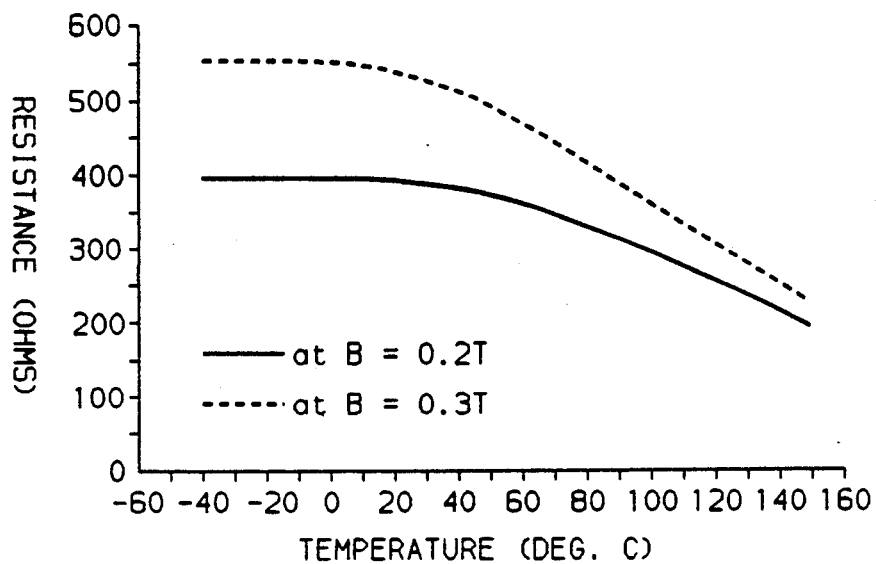
FIG. 3 illustrates the dependence of a typical magnetoresistor's resistance value upon ambient temperature.

Unfortunately, magnetoresistive elements 12 are sensitive to disturbances such as temperature and aging of the permanent magnet 16 which affect their sensitivity and resistance and therefore the maximum, minimum and bias voltages of their respective analog signals. As shown in FIG. 3, the resistance of a typical magnetoresistive element 12 varies greatly with temperature. This is of particular concern in cases where sensors are required to operate over a broad temperature range (e.g., from −40° C. to 150° C., or even higher) as in automobile applications. However, since the three magnetoresistive elements 12a, 12b and 12c are similarly constructed, have identical characteristics and are linearly arranged in close proximity to one another on a common substrate, they respond uniformly to common mode disturbances. Therefore, Vbias and the peak-to-peak voltage (dV) of all three elements will vary uniformly. That is, the Vbias and dV of each magnetoresistive element 12a, 12b and 12c will increase or decrease by the same amount when subjected to identical common mode disturbances. Failure to compensate for these variations may produce faulty logic level signals and result in incorrect position detection.

Referring again to FIGS. 2(A, B and C), at any given time the output of at least one of the magnetoresistive elements 12 is at a maximum voltage while the output of at least one of the magnetoresistive elements 12 is at a minimum voltage. At no time is the voltage of each magnetoresistive element 12a, 12b and 12c simultaneously at a maximum or simultaneously at a minimum. Because of this important condition, and the uniform nature of the voltage variations between each of the magnetoresistive element's analog signals, an accurate estimate of Vbias can be maintained by continuously averaging the maximum and minimum voltages. This method does not require any knowledge of the relative strength of the magnetoresistor's permanent magnet 16 or the ambient temperature. As these conditions change, the bias voltage changes, but the uniformly changing maximum and minimum voltages track those changes and therefore the estimate of Vbias is always accurate.

Figure 4:
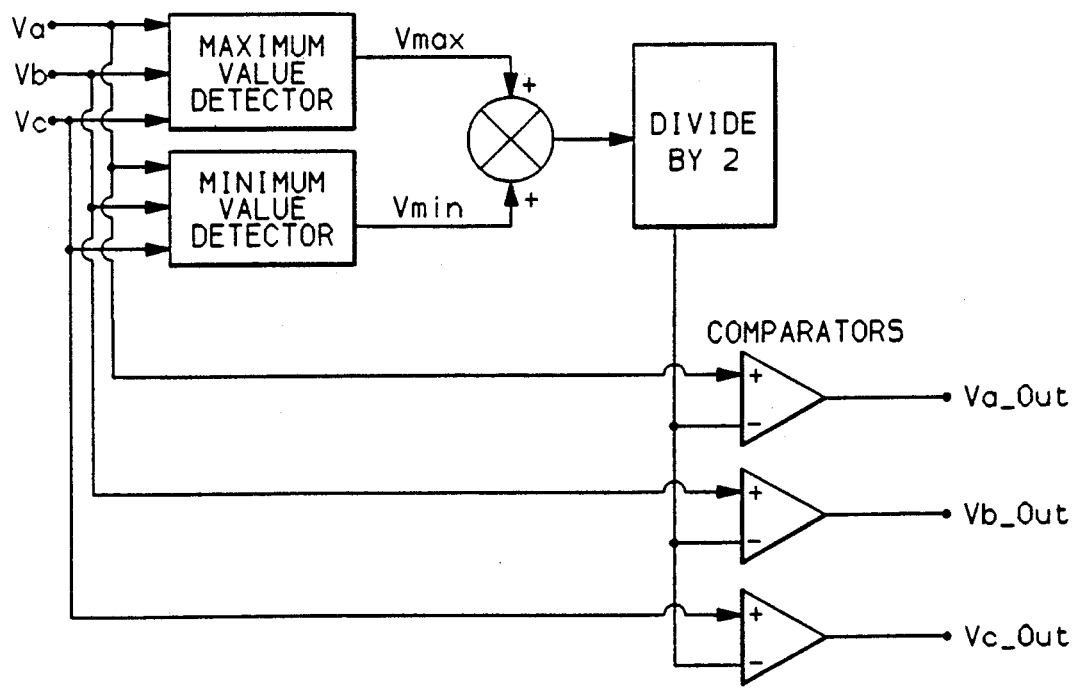
FIG. 4 illustrates a block diagram of a signal conditioning circuit in accordance with this invention.

FIG. 4 illustrates a block diagram of the signal conditioning circuit which is the subject of this invention. The output voltages Va, Vb and Vc of the three magnetoresistive elements 12 of FIG. 1 are fed into maximum and minimum voltage detecting circuits to obtain Vmax and Vmin voltage levels. These voltages are added together and divided by two in order to obtain a single average (threshold) voltage. The analog output voltages are compared, via three separate comparators, with the threshold voltage to produce corresponding binary outputs. All analog output voltages greater than the threshold voltage will produce a binary value of 1 as a comparator output, while analog output voltages less than the threshold voltage will produce a binary value of 0 as a comparator output. In this way, the comparators combine to provide a three-bit digital signal which corresponds to the absolute angular position of the brushless rotor. Referring again to FIGS. 2(A, B and C), the three-bit digital signal corresponding to the analog signals Va, Vb and Vc are noted at the top of the illustration. Notice that only one of the three bits will change state (i.e., 1 to 0 or 0 to 1) every 60 electrical degrees.

Figure 5:
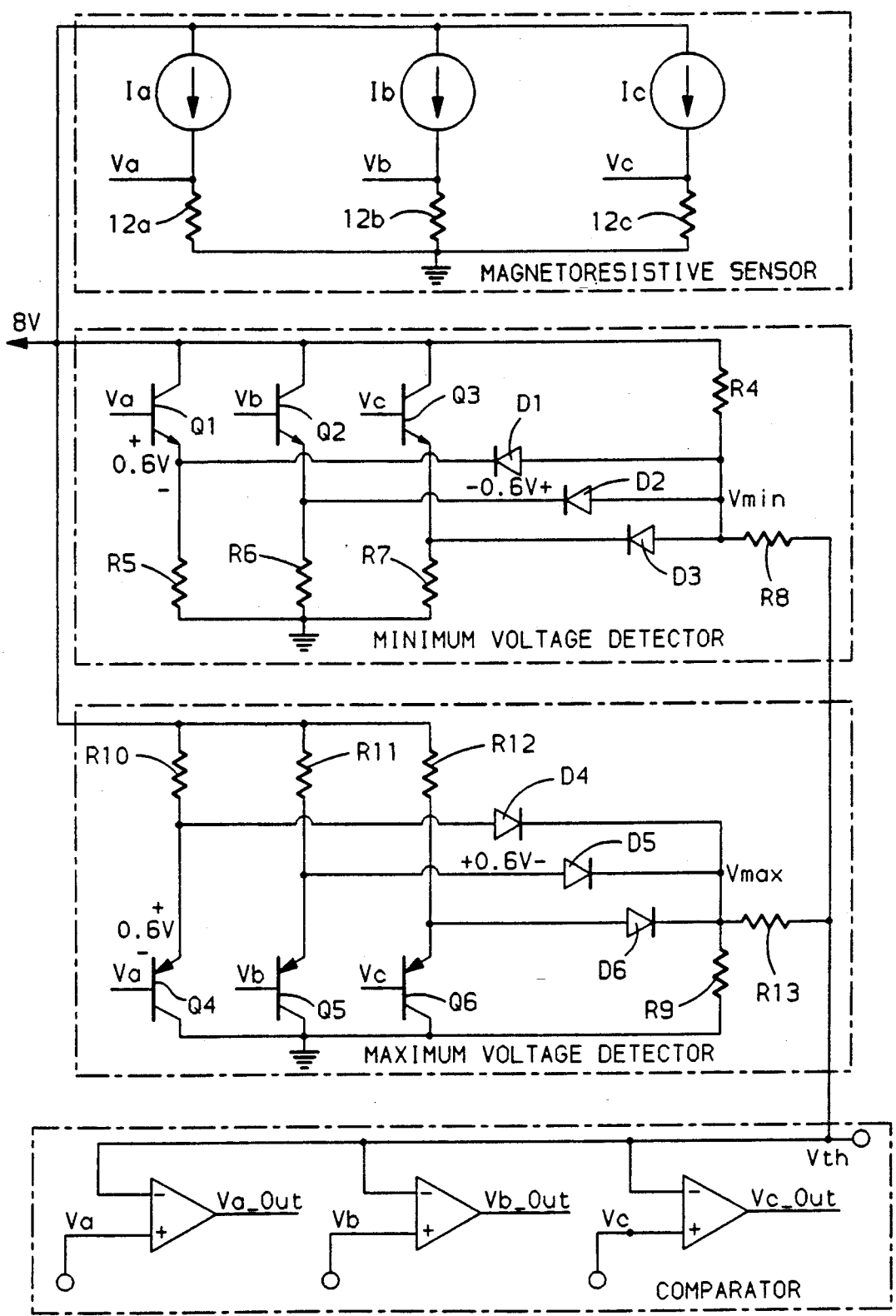
FIG. 5 illustrates a detailed circuit diagram of the signal conditioning circuit depicted in FIG. 4.

FIG. 5 illustrates a detailed electrical diagram of the signal conditioning circuit depicted in FIG. 4. Three constant current sources Ia, Ib and Ic drive the three separate magnetoresistive elements 12a, 12b and 12c. The analog output voltages Va, Vb and Vc vary according to the resistance values of the magnetoresistive elements 12a, 12b and 12c which, in turn, vary with magnetic flux density. The analog output voltages are fed into the minimum voltage detector, maximum voltage detector and comparator circuits.

The minimum voltage detector circuit continuously detects a single absolute minimum voltage the analog signals Va, Vb and Vc and outputs the minimum voltage at the node labeled Vmin. The NPN transistors Q1, Q2 and Q3 are connected as emitter followers so that their respective emitters are at 0.6 V below Va, Vb and Vc. Diodes D1, D2 and D3 and resistor R4 form an analog OR circuit. Whichever emitter is at the lowest potential, the diode which has its cathode connected to that emitter will conduct and clamp the voltage at node Vmin at a level equal to 0.6 V above the lowest of the emitter potentials. For example, if Va is at 2 V while Vb and Vc are at 3 V, then the emitter of Q1 will be at 1.4 V while the emitters of Q2 and Q3 will be at 2.4 V. Diode D1 will conduct and the potential at node Vmin will be equal to 2 V (1.4+0.6). Diodes D2 and D3 will be reverse-biased by 0.4 V (2.4−2.0). Thus, the voltage at node Vmin at any time is a true minimum voltage of signals Va, Vb and Vc. This is because the loss of the NPN transistor base-emitter voltage is compensated by the gain in the forward-biased diode anode-cathode voltage.

The maximum voltage detector circuit continuously detects a single maximum voltage of the analog signals Va, Vb and Vc and outputs the maximum voltage at the node labeled Vmax. The PNP transistors Q4, Q5 and Q6 are connected as emitter followers so that their respective emitters are at 0.6 V above Va, Vb and Vc. Diodes D4, D5 and D6 and resistor R9 form an analog OR circuit. Whichever emitter is at the highest potential, the diode which has its anode connected to that emitter will conduct and clamp the voltage at node Vmax at a level equal to 0.6 V below the highest of the emitter potentials. Thus, the voltage at node Vmax at any time is a true maximum voltage of signals Va, Vb and Vc. This is because the gain of the PNP transistor base-emitter voltage is compensated by the loss in the forward-biased diode anode-cathode voltage.

Resistors R8 and R13 are identical in value and produce, at the node labeled vth, the midpoint (threshold) voltage of Vmax and Vmin as an estimate of the bias voltage. The output voltages Va, Vb and Vc are compared with the threshold voltage (Vth) to form a multi-bit digital signal comprising the binary signals Va_Out, Vb_Out and Vc_Out.

While this invention has been described in reference to the illustrated embodiment, it will be understood that various modifications will occur to those skilled in the art, and that circuits incorporating such modifications may fall within the scope of this invention, which is defined by the appended claims.

The embodiments of this invention in which an exclusive property or privilege is claimed are defined as follows:

1. An angular position sensor for a rotary shaft, comprising:
   means for sensing position of the rotary shaft and generating a plurality of analog signals, each analog signal having a maximum level over a respective predetermined angle of the shaft and a minimum level over a remaining angle of the shaft, the respective predetermined angles of the analog signals being offset from one-another so that at least one of the analog signals is at a maximum level and at least one of the analog signals is at a minimum level;
   means for continuously determining a midpoint value of the maximum and minimum levels of the analog signals; and
   means for comparing the analog signals with the midpoint value and generating a multi-bit digital signal, each bit of the multi-bit digital signal corresponding to a respective one of the analog signals and having a first logic level when the respective analog signal is greater than the midpoint value and having a second logic level when the respective analog signal is less than the midpoint value, wherein the multi-bit digital signal changes with different positions of the rotary shaft in response to the analog signals changing between the maximum and minimum levels to provide and indication of the angular position of the rotary shaft.

2. An angular position detecting apparatus for a rotary shaft, comprising:
   a plurality of members attached to the shaft for rotation therewith;
   a plurality of sensors, each sensor being positioned adjacent to a path taken by a respective one of the members as the rotary shaft is rotated and generating a varying analog signal having a maximum value when the respective one of the members is positioned adjacent the sensor and having a minimum value when the respective one of the members is not positioned adjacent the sensor, the members and the sensors having angular positions around the rotary shaft to offset the varying analog signals from one-another so that at all rotational positions of the shaft at least one of the analog signals is at the maximum value and at least one of the analog signals is at the minimum value;
   means for continuously detecting the maximum value of the analog signals;
   means for continuously detecting the minimum value of the analog signals;
   means for continuously determining a midpoint value between the maximum value and the minimum value; and
   comparing means for continuously comparing the midpoint value with the analog signals and generating a multi-bit digital signal, each bit of the multi-bit digital signal corresponding to a respective one of the multiple analog signals and having a first logic level when the respective analog signals is greater than the midpoint value and having a second logic level when the respective analog signal is less than the midpoint value, wherein the multi-bit digital signal changes with different positions of the rotary shaft in response to the analog signals changing between the maximum and minimum levels to provide an indication of the angular position of the rotary shaft.

3. The apparatus set forth in claim 2, wherein the comparing means comprises multiple comparators, each comparator comparing the midpoint value with a respective one of the multiple analog signals.

4. An absolute angular position detecting apparatus for a rotary shaft, comprising:
   three members attached to the shaft for rotation therewith;
   three sensors, each sensor being positioned adjacent to a path taken by a respective one of the three members as the rotary shaft is rotated and generating a varying analog signal having a maximum value when the respective one of the three members is positioned adjacent the sensor and having a minimum value when the respective one of the three members is not positioned adjacent the sensor, the three members and the three sensors having angular positions around the rotary shaft to offset the three varying analog signals 120 electrical degrees from one-another so that at all rotational positions of the shaft at least one of the three analog signals is at the maximum value and at least one of the three analog signals is at the minimum value;
   means for continuously detecting the maximum value of the three analog signals;
   means for continuously detecting the minimum value of the three analog signals;
   means for continuously determining a midpoint value between the maximum value and the minimum value; and
   comparing means for continuously comparing the midpoint value with the three analog signals and generating a three-bit digital signal, each bit of the three-bit digital signal corresponding to a respective one of the three analog signals and having a first logic level when the respective analog signal is greater than the midpoint value and having a second logic level when the respective analog signal is less than the midpoint value, wherein the three-bit digital signal changes with different positions of the rotary shaft in response to the three analog signals changing between the maximum and minimum levels to provide an indication of the angular position of the rotary shaft.

5. The apparatus set forth in claim 4, wherein only one bit of the three bit digital signal changes logic level every 60 electrical degrees.

6. The apparatus set forth in claim 4, wherein the comparing means comprises three comparators, each comparator comparing the midpoint value with a respective one of the three analog signals.

* * * * *